United States Patent [19]
Doric

[11] Patent Number: 5,638,214
[45] Date of Patent: Jun. 10, 1997

[54] LUNEBURG LENS WITH A GRADED INDEX CORE AND HOMOGENEOUS CLADDING

[75] Inventor: Sead Doric, Ancienne-Lorette, Canada

[73] Assignee: Institut National D'Optique, Sainte-Foy, Canada

[21] Appl. No.: 560,835

[22] Filed: Nov. 20, 1995

Related U.S. Application Data

[62] Division of Ser. No. 334,548, Nov. 4, 1994.

[51] Int. Cl.$^6$ ............................................. G02B 3/00
[52] U.S. Cl. ............................................ 359/654; 359/652
[58] Field of Search ............................. 359/654, 653, 359/652; 385/35, 34

[56] References Cited

U.S. PATENT DOCUMENTS

| | | | |
|---|---|---|---|
| 3,823,995 | 7/1974 | Carpenter | 350/96 |
| 4,203,743 | 5/1980 | Suganuma | 65/419 |
| 4,268,112 | 5/1981 | Peterson | 359/652 |
| 4,277,271 | 7/1981 | Krohn | 65/3 |
| 4,372,767 | 2/1983 | Maklad | 65/3.12 |
| 4,422,733 | 12/1983 | Kikuchi et al. | 359/652 |
| 4,557,566 | 12/1985 | Kikuchi et al. | 359/652 |
| 4,851,024 | 7/1989 | Sakai | 65/900 |
| 4,857,091 | 8/1989 | Geittner | 65/419 |
| 4,867,544 | 9/1989 | Bornstein et al. | 359/654 |
| 4,902,330 | 2/1990 | Sakai | 65/400 |
| 5,047,776 | 9/1991 | Baller | 359/664 |
| 5,080,706 | 1/1992 | Snyder et al. | 65/102 |
| 5,081,639 | 1/1992 | Snyder et al. | 372/101 |
| 5,127,068 | 6/1992 | Baer et al. | 385/34 |
| 5,155,631 | 10/1992 | Snyder et al. | 359/708 |
| 5,181,224 | 1/1993 | Snyder | 372/101 |
| 5,293,269 | 3/1994 | Burkhart | 359/710 |
| 5,417,733 | 5/1995 | Wesson | 65/378 |
| 5,421,848 | 6/1995 | Maier | 65/111 |

OTHER PUBLICATIONS

"Cladded Radially Inhomogeneous Sphere Lenses", Kikuchi, et al., Applied Optics, vol. 20, No. 3, pp. 388 394, Feb. 1, 1981, New York, US.

"Graded–Index Sphere Lens with Hemispherical Rod Cladding", Kikuchi, et al., Applied Optics, vol. 21, No. 15, pp. 2734–2738, Aug. 1, 1982, New York, US.

"General Solution of the Luneberg Lens Problem", Morgan, Journal of Applied Physics, vol. 29, No. 9, pp. 1358–1368, Sep. 9, 1958, New York, US.

"Perfect Concentric Systems with an Outer Shell of Constant Refractive Index", Di Francia, et al., Atti Della Fondazione Giorgio ronchi E Contributi Dell' Istituto Nazionale de Ottica, pp. 223–235, 1958, Italy.

"Spherical Lenses for Infrared and Microwaves", Di Francia, Journal Of Applied Physics, vol. 32, No. 10, p. 2051, Oct. 1961, New York, US.

"Generalized Nonfull–Aperture Luneburg Lens: A New Solution", Doric, Optical Engineering, vol. 32, No. 9, pp. 2118–2121, Sep. 1993. Bellingham, US.

Primary Examiner—Scott J. Sugarman
Assistant Examiner—Jordan M. Schwartz
Attorney, Agent, or Firm—Merchant, Gould, Smith, Edell, Welter & Schmidt, P.A.

[57] ABSTRACT

Disclosed is a nonfull aperture Luneburg-type lens for correction of an adjacent light source. The lens includes a core having a circular cross-section and a graded refractive index, and a cladding enclosing the core. The cladding has a circular cross-section and a homogenous refractive index. Also disclosed is a method for forming the nonfull aperture Luneburg-type lens with a graded index core and a homogenous cladding, and a high numerical aperture laser diode assembly including the nonfull aperture Luneburg-type lens.

4 Claims, 1 Drawing Sheet

LUNEBURG LENS WITH A GRADED INDEX CORE AND HOMOGENEOUS CLADDING

RELATED APPLICATION

The present application is a divisional of U.S. patent application 08/334,548 filed on 4 Nov. 1994, still pending.

FIELD OF THE INVENTION

The present invention relates to a nonfull aperture Luneburg lens with a graded index core and a homogeneous cladding, and to a high numerical aperture laser diode assembly.

BACKGROUND OF THE INVENTION

It is well known that laser diodes alone produce a beam that is divergent and astigmatic. To get better performances from a laser diode, lenses can be placed in front of the beam emitted by the laser diode, to improve its performances.

Different types of lenses can be used to correct the divergence, symmetry and astigmatism of laser diodes. Because laser diodes have an elongated rectangular aperture through which the beam is emitted, the most widely used type of lenses are the cylindrical lenses.

Existing cylindrical lenses used for correcting laser diodes are made of a homogeneous medium, and have a cross-section either circular or noncircular. The cylindrical lenses of circular cross-section are easy to form, but they have poor optical performance when used at high numerical aperture, due to the large spherical aberrations. The cylindrical lenses of noncircular cross-section are capable of producing a better quality beam, but they are more difficult to produce since they require precision grinding of a relatively complex surface and precise centering of the two surfaces forming the lens. In use, the noncircular cylindrical lenses require precise positioning of the lens relative to the laser diode to obtain good results.

There are differenct types of lenses that have been termed as Luneburg lenses. The common threads for all of them are: the spherical symmetry (ball shape) or at least circular cross-section, the aberration-free imaging, except for chromatic aberration and field curvature, and the design principles where the graded index profile is calculated from pre-selected image and object positions. The main problem associated with the design of the Luneburg graded index lenses is to find the design whose refractive index distribution can be realized with the selected technology. With Luneburg cylindrical lens it is possible to preserve the circular cross section of the lens without introducing aberrations.

Known in the art are U.S. Pat. Nos. 5,080,706 and 5,155,631 (Snyder et al) which describe methods for fabrication of cylindrical microlenses of selected shape. These methods consist in first shaping a glass preform into a desired shape. Then, the preform is heated to the minimum drawing temperature and a fiber is drawn from it. The cross-sectional shape of the fiber is cut into sections of desired lengths. Finally, the fiber is cut into sections of desired lengths.

Also known in the art, is U.S. Pat. No. 5,181,224 (Snyder) which describes microlenses. This patent provides several microlens configurations for various types of optical corrections.

Another patent known in the art is U.S. Pat. No. 5,081,639 (Snyder et al), which describes a laser diode assembly including a cylindrical lens. This assembly comprises a laser diode and a cylindrical microlens whose cross-section is different from circular.

OBJECTS OF THE INVENTION

It is therefore an object of the present invention to provide a nonfull aperture Luneburg lens with graded index core and homogeneous cladding that requires less stringent positioning relative to an adjacent source while offering good beam correction. It is also another object of the present invention to provide a high numerical aperture laser diode assembly that is simple to build, not expensive and that offers good performances.

SUMMARY OF THE INVENTION

It is an object of the invention to provide a nonfull aperture Luneburg lens for optical correction of an adjacent light source, the Luneburg lens comprising:

a core having a circular cross-section and a graded refractive index distribution; and a cladding enclosing the core, the cladding having a circular cross-section and a homogeneous refractive index.

Preferably, the nonfull aperture Luneburg lens has a cylindrical shape and is drawn from a drawn glass preform.

Also, another object of the present invention is to provide a high numerical aperture laser diode assembly comprising:

a laser diode source having an elongated rectangular aperture for emitting a laser beam through the elongated rectangular aperture;

a Luneburg cylindrical lens parallel to the elongated rectangular aperture and set in front of the laser beam for optical correction thereof, the Luneburg lens comprising:

a core having a circular cross-section and a graded refractive index distribution; and a cladding enclosing the core, the cladding having a circular cross-section and a homogeneous refractive index.

Preferably, the Luneburg lens is drawn from a glass preform.

A non restrictive description of a preferred embodiment will now be given with reference to the appended drawings.

DESCRIPTION OF A PREFERRED EMBODIMENT

Several characteristics are used to describe a lens. More particularily, to describe lenses that are made from a glass preform, the characteristics are: the size of the core, which is described by its radius, the size of the cladding, described by its external radius, the object distance, and the image distance. To lighten this text, the radius of the core is called a, the external radius of the cladding is unitary (normalized), the object distance is called $s_1$ and the image distance is called $s_2$. These values are scalable to whatever the external size of the cladding is. Moreover, the expression "optically correcting" refers to aberration correction but does not include chromatic aberration and field curvature.

Figure 1:
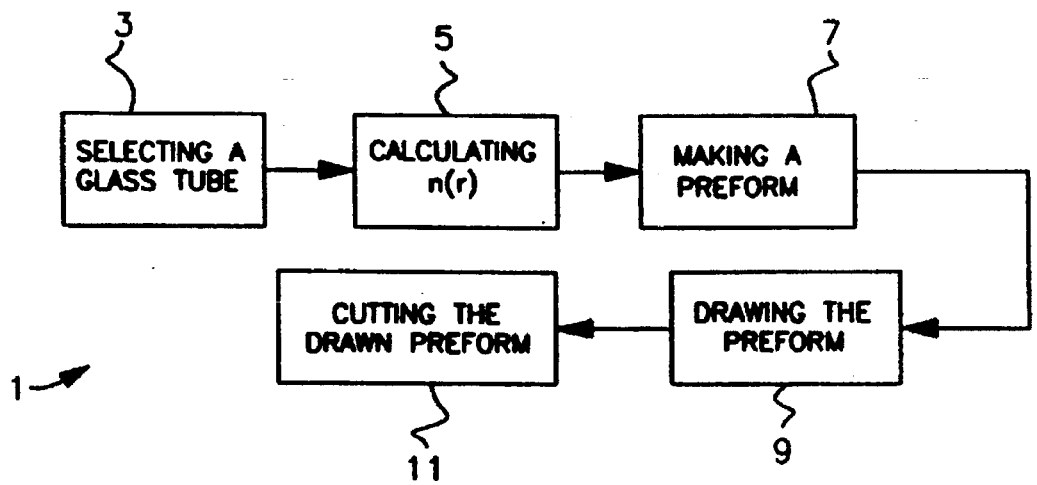
FIG. 1 is a block diagram of a method for forming a nonfull aperture Luneburg lens with a graded index core and a homogeneous cladding according to the invention.

Referring now to FIG. 1, there is shown a method 1 for forming a nonfull aperture Luneburg lens with a graded index core and a homogeneous cladding. The first step of the method consists in selecting 3 a glass tube 19, which will be used as a cladding, characterized by its external and internal radii and by a refractive index N.

The next step of the method consists in calculating 5 a refractive index profile n(r), where r is the distance from the center of the core. That refractive index profile takes into account the desired characteristics of the lens to be made. These characterisitics are the desired core radius, the desired object distance and the desired image distance for a unit cladding radius. The refractive index profile is calculated with formula (1).

$$n = \frac{P_a}{a} \exp \{\Omega(\rho,s_1,P_a) + \tag{1}$$

$$\Omega(\rho,s_2,P_a) - 2\Omega(\rho,1,P_a) + 2\Omega(\rho,P_1,P_a)\}$$

In this formula, the expression $\rho$ relates to the refractive index of the core of the lens, such as described in equation (2):

$$\rho = \rho(r) = n(r)*r, \text{ where } 0 \leq r \leq a \text{ and where } * \text{ represents multiplication} \tag{2}$$

This refractive index of the core $\rho$ is calculated with equation (3).

$$\ln\left(\frac{a}{r}\right) = \frac{2}{\pi} \int_\rho^{P_a} \frac{(f(k) - F(k))}{(k^2 - \rho^2)^{\frac{1}{2}}} \, dk, \; 0 \leq \rho \leq P_a \tag{3}$$

where:

$$f(k) = \frac{1}{2}\left(\arcsin\frac{k}{s_1} + \arcsin\frac{k}{s_2} + 2*\arccos(k)\right) \tag{4}$$

and $$F(k) = \int_a^1 \frac{kdr}{r(P^2(r) - k^2)^{\frac{1}{2}}} \; 0 \leq k \leq P_a \tag{5}$$

In equations (1), (2) and (4), $P_1$ and $P_1$ are determined by:

$$P_1 = N*a; \tag{6}$$

$$P_1 = N; \tag{7}$$

where $P_1$ and $P_1$ are particular cases of P(r) which is a specially selected function for the cladding, such as defined in the next equation:

$$P = P(r) = N*r, \text{ where } a \leq r \leq 1; \tag{8}$$

The expression $\Omega(\rho,s,P)$ of equation (1) can be generally expressed by the following equation:

$$\Omega = \frac{1}{\pi} \int_\rho^{P_a} \frac{\arcsin\left(\frac{x}{s}\right)}{\sqrt{(x^2 - \rho^2)}} \, dx \tag{9}$$

Thus, the $\Lambda$ expressions in equation (1) represent the following:

$$\Omega(\rho,s_1,P_a) = \frac{1}{\pi} \int_\rho^{P_a} \frac{\arcsin\left(\frac{x}{s_1}\right)}{\sqrt{(x^2 - \rho^2)}} \, dx; \tag{10}$$

$$\Omega(\rho,s_2,P_a) = \frac{1}{\pi} \int_\rho^{P_a} \frac{\arcsin\left(\frac{x}{s_2}\right)}{\sqrt{(x^2 - \rho^2)}} \, dx; \tag{11}$$

$$\Omega(\rho,1,P_a) = \frac{1}{\pi} \int_\rho^{P_a} \frac{\arcsin(x)}{\sqrt{(x^2 - \rho^2)}} \, dx; \tag{12}$$

$$\Omega(\rho,P_1,P_a) = \frac{1}{\pi} \int_\rho^{P_a} \frac{\arcsin\left(\frac{x}{P_1}\right)}{\sqrt{(x^2 - \rho^2)}} \, dx. \tag{13}$$

The following step consists in making a preform by introducing 7 graded optical material inside of the chosen glass tube and by collapsing the glass tube and the introduced graded optical material into the preform, to obtain the refractive index profile calculated in the previous step.

The graded optical material may be deposited directly inside the tube by means of a modified chemical vapour deposition process.

Another way to make a preform consists of using an ion-exchange process. That process is used to modify the refractive index profile of a glass rod to correspond to the refractive index profile previously calculated, and to introduce the glass rod inside of the glass tube, the glass rod becoming the core of the preform and the glass tube the cladding of the preform.

One may also subsequently verify whether the refractive index profile of said preform is substantially equal to the refractive index profile as calculated, and if necessary, repeating the process and slightly changing deposition parameters until the refractive index profile of the preform is substantially equal to the refractive index profile as calculated.

Finally, the last step consists of drawing 9 the preform into a Luneburg lens having desired radius. The method 1 may also comprise one last step which consists of cutting 11 the drawn preform to a predetermined length. This method is thus simple and it does not need precise grinding nor precise centering. The circular shape of the lens makes it easily scalable for a wide range of focal lengths.

Figure 2:
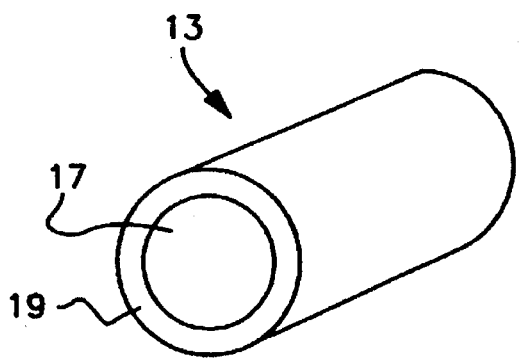
FIG. 2 is a perspective view showing a nonfull aperture Luneburg lens with a graded index core and a homogeneous cladding according to the invention.
Figure 3:
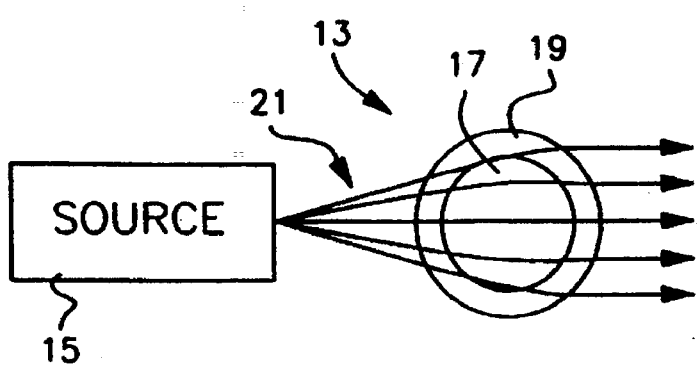
FIG. 3 is a side elevational view of a high numerical aperture laser diode assembly according to the invention.

Referring now to FIGS. 2 and 3, there is shown a nonfull aperture Luneburg lens 13 for optical correction of an adjacent light source 15, such as a laser diode. That lens 13 has a cylindrical shape. It has a core 17 of circular cross-section and graded refractive index distribution. The lens 13 has a cladding 19 enclosing the core 17. The cladding 19 has a circular cross-section and a homogeneous refractive index. The refractive index distribution inside the core 17 corrects the aberrations of the cladding 19 but only for the light rays that also pass through the core 17, hence the name nonfull aperture lens. That lens 13 could be made, for example, from a drawn glass preform having an outer portion made of fused silica.

The lens has to be placed in front of the aperture (not shown) of the light source 15 to optically correct its beam. Its circular form and very good aberration correction at high numerical apertures makes this lens 13 less sensitive to positioning errors.

Referring now to FIG. 3, there is shown a high numerical aperture laser diode assembly. This assembly comprises a laser diode source 15 and a nonfull aperture Luneburg cylindrical lens 13. The laser diode source 15 has an elongated rectangular aperture (not shown) for emitting a laser beam 21 through that aperture. The Luneburg cylindrical lens 13 is placed parallel to the elongated rectangular aperture and set in front of the laser beam 21 for optically correcting that beam.

The Luneburg lens 13 has a core 17 and a cladding 19. The core 17 has a circular cross-section and a graded refractive index distribution, and the cladding 19 encloses the core 17. The cladding 19 has a circular cross-section and a homogeneous refractive index. The Luneburg lens 13 may be made from a drawn glass preform having a cladding made of fused silica.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A nonfull aperture Luneburg lens for optical correction of an adjacent light source, the Luneburg lens having a normalized external radius, an object distance $s_1$, an image distance $s_2$ and being made from a drawn glass preform, the Luneburg lens comprising:

a core having a circular cross section and a graded refractive index distribution, the core having a core radius a;

a cladding enclosing the core, the cladding having a circular cross section, a homogeneous refractive index N, an internal radius and an external radius; and the core having a refractive index profile n(r), where r is the distance from the center of the core, the refractive index profile being calculated using the equation:

$$n = \frac{P_a}{a} \exp\{\Omega(\rho, s_1, P_a) + \Omega(\rho, s_2, P_a) - 2\Omega(\rho, P_1, P_a)\}$$

wherein:
$P = P(r) = N*r$, where $a \leq r \leq 1$;
$\rho = \rho(r) = n(r)*r$, where $0 \leq r \leq a$;
$P_a = N*a$;
$P_1 = N$;

$$\Omega(\rho, s_1, P_a) = \frac{1}{\pi} \int_\rho^{P_a} \frac{\arcsin\left(\frac{x}{s_1}\right)}{\sqrt{(x^2 - \rho^2)}} dx;$$

$$\Omega(\rho, P_1, P_a) = \frac{1}{\pi} \int_\rho^{P_a} \frac{\arcsin\left(\frac{x}{P_1}\right)}{\sqrt{(x^2 - \rho^2)}} dx;$$

$$\Omega(\rho, s_2, P_a) = \frac{1}{\pi} \int_\rho^{P_a} \frac{\arcsin\left(\frac{x}{s_2}\right)}{\sqrt{(x^2 - \rho^2)}} dx;$$

$$\Omega(\rho, 1, P_a) = \frac{1}{\pi} \int_\rho^{P_a} \frac{\arcsin(x)}{\sqrt{(x^2 - \rho^2)}} dx;$$

2. A Luneburg lens according to claim 1, wherein the Luneburg lens has a cylindrical shape.

3. A Luneburg lens according to claim 2, wherein the glass preform has an outer portion made of fused silica.

4. A Luneburg lens according to claim 3, wherein the light source is a laser diode.

* * * * *